US012671050B2

(12) United States Patent
Gentsch et al.

(10) Patent No.: US 12,671,050 B2
(45) Date of Patent: Jun. 30, 2026

(54) VACUUM INTERRUPTER FUSE

(71) Applicant: ABB Schweiz AG, Baden (CH)

(72) Inventors: Dietmar Gentsch, Ratingen (DE); Werner Ebbinghaus, Waltrop (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/408,844

(22) Filed: Jan. 10, 2024

(65) Prior Publication Data

US 2024/0234068 A1 Jul. 11, 2024

(30) Foreign Application Priority Data

Jan. 11, 2023 (EP) .................................... 23151172

(51) Int. Cl.
*H01H 85/047* (2006.01)

(52) U.S. Cl.
CPC ................................ *H01H 85/047* (2013.01)

(58) Field of Classification Search
CPC .. H01H 85/047; H01H 31/127; H01H 33/664; H01H 2085/386; H01H 85/36; H01H 85/143
See application file for complete search history.

(56) References Cited

U.S. PATENT DOCUMENTS 2,145,375 A * 1/1939 Schultz .................. H01H 85/42 313/325
2,918,551 A * 12/1959 Kozacka .............. H01H 85/303 337/244
3,113,193 A * 12/1963 Jacobs, Jr. ........... H01H 85/306 337/148

(Continued)

FOREIGN PATENT DOCUMENTS

DE 2822773 A1 11/1979
EP 0210778 A2 2/1987

OTHER PUBLICATIONS

Silbermann Erich Ing Grad, "Fuse link in vacuum housing—forms part of plug connector for medium voltage installations with short link generating small amount of heat", Nov. 29, 1979, Siemens AG, Entire Document (Translation of DE 2822773) (of record, cited in IDS, including Original Document) (Year: 1979).*

(Continued)

*Primary Examiner* — Stephen S Sul
(74) *Attorney, Agent, or Firm* — Fitch Even Tabin & Flannery LLP

(57) ABSTRACT

A CutOut, comprising a first electrical connection rod; a second electrical connection rod; a first contact; a second contact; and a fuse wire; wherein the first contact is mounted to the first electrical connection rod; wherein the second contact is mounted to the second electrical connection rod; wherein when a current below a threshold levels flows through the vacuum-based fuse-CutOut or no current flows through the vacuum-based fuse-CutOut the vacuum-based fuse-CutOut is configured to hold the first contact a fixed distance from the second contact and the fuse wire is configured to electrical connect the first electrical connection rod to the second electrical connection rod; and wherein when a current at or above the threshold flows through the vacuum-based fuse-CutOut the fuse wire is configured to electrically disconnect the first electrical connection rod from the second electrical connection rod.

13 Claims, 2 Drawing Sheets

(56) References Cited

U.S. PATENT DOCUMENTS

| | | | | | |
|---|---|---|---|---|---|
| 3,510,819 | A | | 5/1970 | Smith | |
| 3,522,571 | A | * | 8/1970 | Axford | H01H 85/042 337/203 |
| 3,686,604 | A | * | 8/1972 | Link | H01R 13/68 337/201 |
| 3,898,602 | A | * | 8/1975 | Schurter | H01H 31/127 337/279 |
| 3,909,765 | A | | 9/1975 | Link | |
| 4,272,751 | A | * | 6/1981 | Biller | H01H 85/36 337/240 |
| 4,713,644 | A | | 12/1987 | Nash et al. | |
| 4,742,323 | A | * | 5/1988 | Oakes | H01H 85/165 337/273 |
| 4,945,333 | A | * | 7/1990 | Stroud | H01H 85/42 337/277 |
| 8,497,446 | B1 | * | 7/2013 | Glaser | H01H 33/664 218/136 |
| 9,490,093 | B2 | * | 11/2016 | Brusky | H02H 3/006 |
| 2008/0302763 | A1 | * | 12/2008 | Stoving | H01H 33/6645 218/124 |
| 2015/0014129 | A1 | * | 1/2015 | Brusky | H02H 1/0092 200/61.08 |

OTHER PUBLICATIONS

Lamara et al., "Theoretical and Experimental Investigation of New Innovative TMF-AMF Contacts for High-Current Vacuum Arc Interruption," *IEEE Transactions on Plasma Science*, 41(8): 2043-2050 (Aug. 2013).

European Patent Office, Extended European Search Report in European Patent Application No. 23151172.6, 10 pp. (Jul. 5, 2023).

* cited by examiner

VACUUM INTERRUPTER FUSE

CROSS-REFERENCE TO RELATED APPLICATIONS

The instant application claims priority to European patent application Ser. No. 23/151,172.6, filed Jan. 11, 2023, which is incorporated herein in its entirety by reference.

FIELD OF THE DISCLOSURE

The present disclosure describes Vacuum interrupter fuse, for low, medium, and high voltage use, also termed a CutOut fuse, and, more specifically, a fuse that further includes a short circuit current interruption function.

BACKGROUND OF THE INVENTION

In electrical distribution, a fuse cutout or cut-out fuse (often referred to as a cutout) is a combination of a fuse and a switch, used in primary overhead feeder lines and taps to protect distribution networks (equipment like overhead lines, transformers etc.) in short circuit and overload situations. An overcurrent caused by a fault in the transformer or customer circuit will cause the fuse to melt and the switch mechanism to visibly open, disconnecting the transformer from the line. The device can also be opened manually by utility linemen standing on the ground and using a long insulating stick called a "hot stick."

An expulsion fuse cutout consists of three major components. The first is the cutout body, an open frame that supports the fuse holder and a ribbed porcelain or polymer insulator that electrically isolates the conductive portions of the assembly from the support to which the insulator is fastened. The second is the fuse holder, also called the "fuse tube," an insulating tube which contains the replaceable fuse-link element. When the contained fuse-link melts ("blows in case of higher current loads"), it opens the circuit, and the fuse holder drops out of the upper contact and hangs from a hinge on its lower end. This hanging fuse holder provides a visible indication that the expulsion fuse has operated and assurance that the circuit is open. The circuit can also be opened manually by pulling out the fuse holder using a hot stick.

The third element is the fuse element, or "fuse-link", which is the replaceable portion of the assembly that melts and breaks (interrupts the current load) the circuit when the electric current through it exceeds its rated current value.

The fuse-link elements used in most distribution CutOuts are mainly in tin or silver alloy wires that melt when subjected to high enough current. Ampere ratings of fuse-link elements typically vary from 1 ampere to 200 amperes.

CutOuts are typically mounted about 20 degrees off vertical so that the center of gravity of the fuse holder is displaced and the fuse holder will rotate and fall open under its own weight when the expulsion fuse blows. Mechanical tension on the fuse-link normally holds an ejector spring in a stable position. When the fuse-link blows, the released spring pulls the pigtail of the fuse-link out of the fuse tube to enable to get interruption and to avoid damage to the transformer and fuse holder. This quenches any arc in the fuse tube.

Each fuse tubes typically has an attached pull ring that can be engaged by a hook at the end of a fiberglass hot stick operated by a line worker standing on the ground or from a bucket truck, to manually open the switch. While often used for switching, the standard CutOut shown is not designed to be manually opened under load. For applications where the switch is likely to be used to interrupt power manually, a "load break" version is available that has an attachment to quench the arc.

Expulsion CutOut fuses are releasing gases produced by internal arcing results in current interruption. They utilize Aluminum Hydroxide to create the de-ionizing action needed to interrupt the current, to quench the arc.

Presently fuse CutOut expulsion fuses are also mainly installed in current overhead lines to protect and provide safety in the network. Here the expulsion fuse can interrupt currents in the range of several ampere but are also able to interrupt higher load currents/short circuit currents up to several kA if needed.

The current flow through the CutOut of an expulsion fuse is done using a fuse-link inside of a top side closed fuse tube and on the other side open fuse-tube arrangement. The fuse-tube is concentric oriented around the fuse-link.

In the situation when the interruption of rated fuse current must be done, even up to several 100A, the load interruption takes place mainly inside the fuse-tube only (exposed to atmospheric air gas and pressure), because the quantity of plasma gases generated during the interruption must be released from the fuse-tube open side to the atmosphere, and this causes limitations in performance.

In the situation where a short circuit current interruption must be done, the amount of plasma released is high and can cause a fire risk to components surrounding the expulsion fuse due to the expulsion of plasma, and the interruption is extremely loud.

Furthermore, in an expulsion fuse as a consequence of interruption chemical components are released from the fuse-tube due to the desired and needed arc quenching and generation of plasma and interaction of that plasma with the inner wall. The interruption plasma is not only ejected but the plasma interacts with the inner layer of the fuse-tube, and consequently some chemically cracked components are also released from the fuse-tube into the atmosphere along with the plasma.

There is a developing need in market sectors, already established in (California/USA) market segments, to avoid sparking and gas release to the environment from currently used expulsion CutOut fuses.

Drawbacks of current devices is the plasma exhaust chemical components combined with a very noisy interruption. There are also limitations based on dimension constrains to meet performance requirements (the possibility to withstand robust the transient recovery voltage (TRV) of more than 0.1 kV/μs while current interruption), and the expulsion fuses are costly as well.

BRIEF SUMMARY OF THE INVENTION

Therefore, it would be advantageous to have an improved fuse-CutOut based on vacuum technology. In a first aspect, the present disclosure describes a vacuum-based fuse-CutOut device, comprising: a first electrical connection rod; a second electrical connection rod; a first contact; a second contact; and a fuse wire.

The first contact is mounted to the first electrical connection rod. The second contact is mounted to the second electrical connection rod. When a current flows through the vacuum-based fuse-CutOut or no current flows through the vacuum-based fuse-CutOut. It is configured to hold the first contact a fixed distance from the second contact and the fuse-wire is configured to electrical connect the first electrical connection rod to the second electrical connection rod.

When a current at or above the threshold flows through the vacuum-based fuse-CutOut the fuse wire is configured to electrically disconnect the first electrical connection rod from the second electrical connection rod.

BRIEF DESCRIPTION OF THE SEVERAL VIEWS OF THE DRAWING(S)

DETAILED DESCRIPTION OF THE INVENTION

As discussed above currently used expulsion fuse CutOut fuses have the advantage to interrupt load- or short circuit current. The clear drawback is the release of chemical components during load- and short circuit current interruption and the plasma flame to the surrounding which might be damage nearby components. In addition, and especially during the short circuit current interruption it's noisy and sounds like an explosion.

Presently available current limiting fuses have full functionality but are bulky and the performance is quite limited and costly compared to the expulsion fuse CutOut device and can be close to a factor of 10 times higher in cost.

To overcome these disadvantages a new vacuum-based fuse-CutOut and vacuum interrupter device having such a vacuum-based fuse-CutOut were developed.

Figure 1:
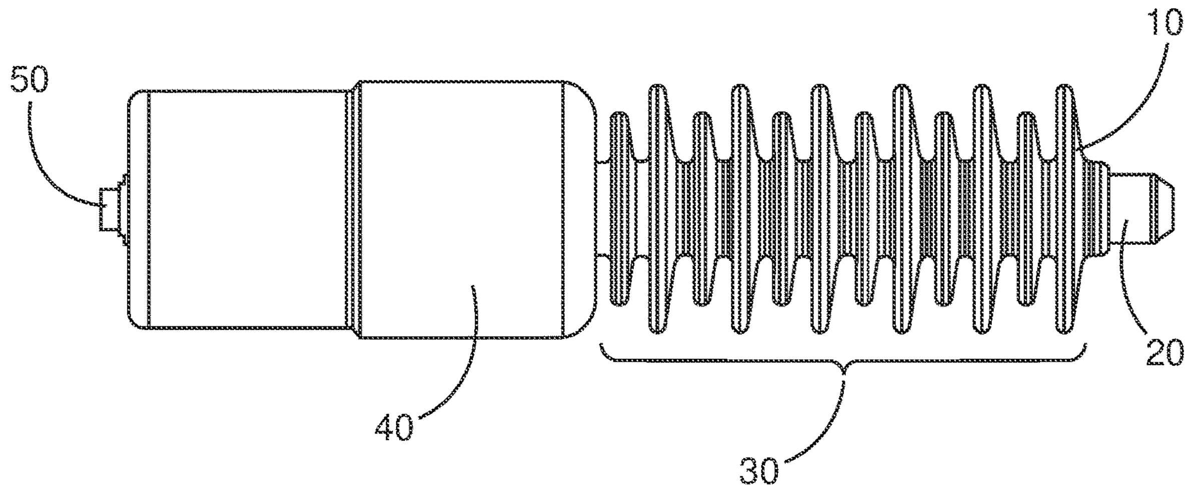
FIG. 1 is an outline view from a side perspective of a complete vacuum-based fuse-CutOut device that has a vacuum interrupter fuse in accordance with the disclosure.
Figure 2:
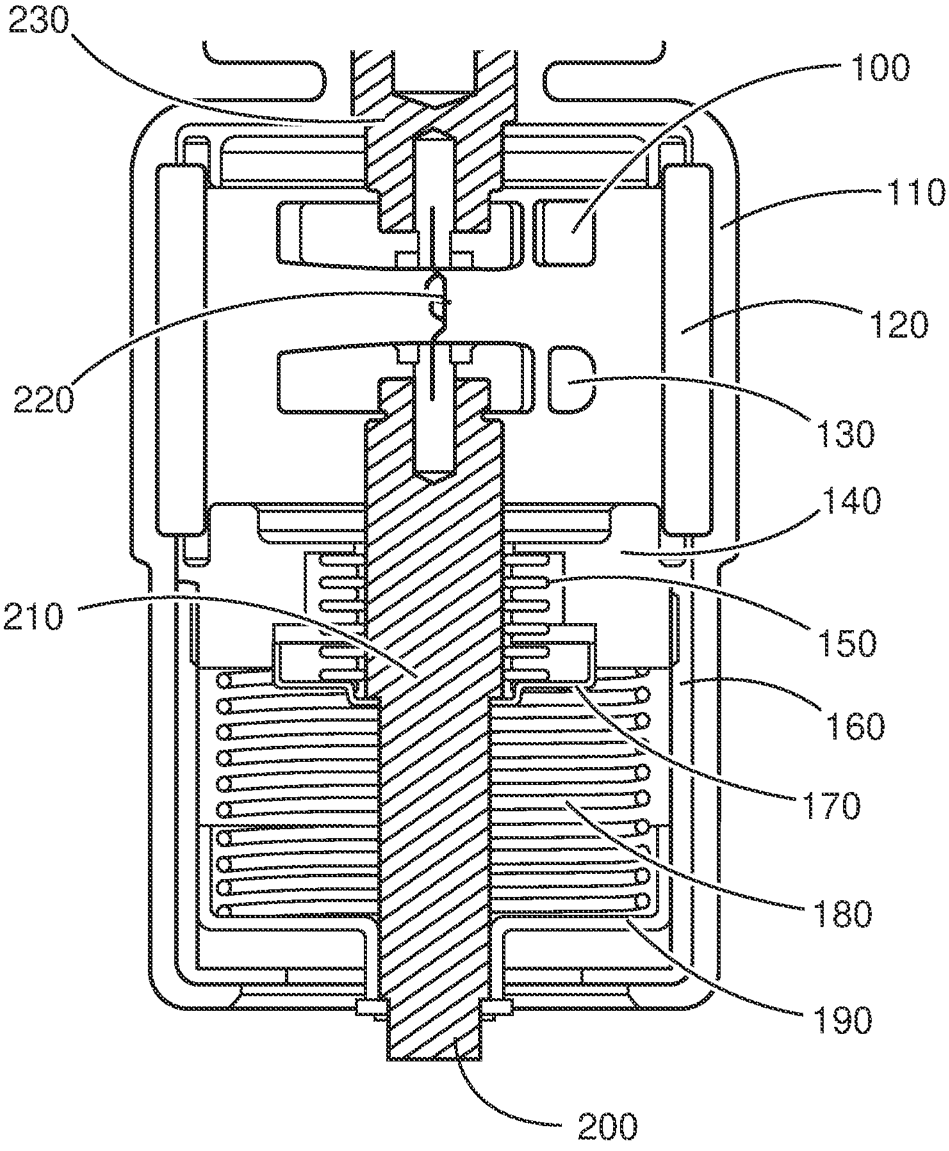
FIG. 2 is an enlarged section view of the vacuum-based fuse-CutOut as shown in FIG. 1.

FIGS. 1-2 relate to the new vacuum-based fuse-CutOut and vacuum-based fuse-CutOut having such a vacuum fuse.

An exemplar vacuum-based fuse-CutOut 40 comprises: a first electrical connection rod 230; a second electrical connection rod 210; a first contact 100; a second contact 130; and a fuse wire 220.

The first contact is mounted to the first electrical connection rod. The second contact is mounted to the second electrical connection rod. When a current below a threshold levels flows through the vacuum-based fuse-CutOut or no current flows through the vacuum-based fuse-CutOut the vacuum-based fuse-CutOut is configured to hold the first contact a fixed distance from the second contact and the fuse wire is configured to electrical connect the first electrical connection rod to the second electrical connection rod. When a current at or above the threshold flows through the vacuum-based fuse-CutOut the fuse wire is configured to electrically disconnect the first electrical connection rod from the second electrical connection rod.

In an example, when the fuse wire electrically disconnects the first electrical connection rod from the second electrical connection rod the vacuum-based fuse-CutOut is configured to move the second contact away from the first contact.

In an example, when the fuse wire electrically disconnects the first electrical connection rod from the second electrical connection rod the vacuum-based fuse-CutOut is configured to move the second electrical connection rod away from the first electrical connection rod.

In an example, the second contact is fixedly mounted to the second electrical connection rod.

In an example, the vacuum-based fuse-CutOut comprises a release spring 180, and when the fuse wire electrically disconnects the first electrical connection rod from the second electrical connection rod the release spring is configured to move the second contact away from the first contact.

In an example, the first contact is a transverse magnetic field, TMF, contact, and the second contact is a TMF contact.

In an example, the first contact is an axial magnetic field, AMF, contact, and the second contact is an AMF contact.

In an example, the first contact is a transverse magnetic field, TMF, contact, and the second contact is an AMF contact.

In an example, the first contact is an AMF contact, and the second contact is a TMF contact.

In an example, there is hybrid contact installed with combination of AMF/TMF or TMF/TMF.

In an example, the vacuum-based fuse-CutOut comprises a steel wire, and wherein when the current below the threshold levels flows through the vacuum-based fuse-CutOut or no current flows through the vacuum-based fuse-CutOut the first contact is held the fixed distance from the second contact at least in part by the steel wire.

In an example, when the current below the threshold levels flows through the vacuum-based fuse-CutOut or no current flows through the vacuum-based fuse-CutOut the first contact is held the fixed distance from the second contact at least in part by the fuse wire.

In an example, the vacuum-based fuse-CutOut comprises an outer body 110, and the outer body is configured to maintain a vacuum within the body when the current below the threshold levels flows through the vacuum-based fuse-CutOut or no current flows through the vacuum-based fuse-CutOut.

In an example, the vacuum-based fuse-CutOut comprises an insulation part 120 located within the outer body, and wherein the insulation part surrounds the first contact and the second contact when the current below the threshold levels flows through the vacuum-based fuse-CutOut or no current flows through the vacuum-based fuse-CutOut.

In an example, the insulation part surrounds the first contact and the second contact during movement of the second contact away from the first contact when the fuse wire electrically disconnects the first electrical connection rod from the second electrical connection rod.

A complete vacuum-based fuse-CutOut comprises a vacuum-based fuse-CutOut 40 as described in any of the examples above. The device also comprises a first electrical connector 20 connected to the first electrical connection rod 230 of the vacuum-based fuse-CutOut; a second electrical connector 50 connected to the second electrical connection rod 210 of the vacuum-based fuse-CutOut; and at least one insulation structure 10, 30 surrounds at least part of the first electrical connector 20.

The new vacuum-based fuse-CutOut is described in specific detail below, where again reference is made to FIGS. 1-2.

The vacuum-based fuse-CutOut in accordance with the disclosure is a one-time use vacuum device, which has two current carrying terminals inside the vacuum environment inside the vacuum device. The new vacuum-based fuse-CutOut has the function of a fuse CutOut and will be very similar in the function to an expulsion fuse CutOut.

The new vacuum-based fuse-CutOut has the following functionally. The fuse wire will short circuit both installed contacts used in the vacuum device. In case of fuse current interruption, the wire between both the contacts will melt when a threshold current is reached, and a spark or arc will occur between both the contacts and will be interrupted or quenched as well. In the case of overcurrent interruption functionality, the "full-range" function is given because due to the vacuum insulation around the wire the fuse-wire will melt a bit above the rated fuse current and the full range characteristic will be achieved. At short circuit current conditions, the fuse-wire instantly melts and the short circuit current is established/ignited and a vacuum arc is created. This arc is however steered, like in today's vacuum interrupter technology, between both contacts and finally be interrupted at current zero. The arc will be kept inside the vacuum device, and after interruption the part (fuse wire) can be completely exchanged/replaced like the solutions we have today in current limiting fuse. On one side of the device an elastic lid or a bellows is provided, which allows a movement of a pin to get a striker function: After the interruption of the fuse, a CutOut automatically drops out to show it's visible cut off operation and showing a separation/insulation distance. The new technique provides a vacuum device, which has two transverse magnetic field. (TMF)—Butt—, axial magnetic field (AMF) or hybrid (TMF-AMF) contacts with a fixed contact gap between the contact pair.

A "fuse wire" is installed between the 2×TMF contacts and/or on the electrical rods to which the contacts are mounted to let the current flow through the device. The wire is installed "freely" in the vacuum atmosphere or can be covered to achieve specific melting characteristics (known from standard fuse technology).

Furthermore, a steel wire can be placed in addition to the fuse-wire to provide mechanical support from top side in situation when a spring force on the striker side is utilized to release mechanical energy on CutOut mechanism that aids in keeping the contacts at a fixed separation until the fuse-wire melts. The main advantage is the comparable low cost of such a technology, with the providing of a "green" and safe interruption, with no sparking and no gas or plasma release to the environment. Furthermore, the noise while interruption is quite limited and silent.

Because of the superior dielectric behaviour of the interruption device, the part as such can be small. The dielectrically performance in air (or the surrounding atmosphere) is being provided by an insulation material, like silicone or other outdoor material. To have a corrosion protection and UV-light resistance this material can be applied to elongate the creepage length and to avoid flashover along the interruption device at the time of load or short circuit interruption.

FIG. 1 shows an outer view of the new vacuum-based fuse-CutOut device coated with embedding material, and FIG. 2 shows a cross section of the vacuum-based fuse-CutOut.

The vacuum-based fuse-CutOut allows the required fuse functionality purely based on the melting of the fuse wire 220. The fuse wire can be inserted as shown in FIG. 1 and elongated in length by providing a hollow structure inside the contact and connection part, not shown here.

Both shown contact parts 110 and 130 are used in case a short circuit interruption current must be done. Rated current interruption is possible even with only Butt-contacts. Due to the vacuum technology a high transient recovery voltage (TRV) can be accommodated, without the risk of failing current interruption at current zero. This means that the different required TRV values in the markets around the world can be met with the same new fuse.

In the situation when interruption is required, the fuse-wire 220 will melts with a foreseeable melting characteristic. The rated- and short circuit current interruption is done in the gap distance between the contact 100 and 130. Only a slight movement of the so-called movable side (the contact 130 and/or the electrical connection rod 210) is needed to get the striker functionality to release the drop-out function of the fuse CutOut in case that will be needed. The fuse-wire can be supported by a steel wire which is installed in parallel to the fuse-wire 220 to keep the mechanically pre-loaded spring 180 in position and provide the potential energy to get the striker moving functionality.

To get a certain movement for the striker a movement inside the vacuum fuse 40 is facilitated using a membrane or a simple bellows 150; only one single operation is needed. The insulation and to keep the vacuum device sealed is given by the insulation part 120, to insulate for example the support lid 140 and the electrical connection rod 230 in case of current interruption. The support lid 140 and the insulation part 120 can abut each other.

An outer insulation can be achieved by an over moulding of the device using silicone 10 for example, as shown FIG. 1. This provides the needed insulation distance to take the voltage while current interruption and providing corrosion protection as well. On or more parts, and indeed the full CutOut vacuum device 40, can be covered with the insulation material.

In summary the following advantages are provided by the new vacuum-based fuse-CutOut: Spark-free and a so-called green current interruption technology; Low cost for the device based on the well-developed vacuum technology; Use of known TMF/AMF or hybrid contact(s); Less type testing required based on vacuum technology steep TRV requirements will be taken easily.

The number of required variants can be limited because the TRV needs can be covered based on the vacuum technology via smaller number of variants. Specific high short circuit interruption performance—less volume needed—dimensions comparable low. Dimensions can fit to today's CutOut holder and mechanism and the electrical insulation for each rating, and can be smaller than today's technology.

LIST OF REFERENCE NUMERALS

10 Outer insulation material or surrounding insulation
20 Electrical connection rod, or connector, one side of connection to the CutOut current connection circuit
30 Insulation structures with creepage ribs
40 Vacuum-based fuse-CutOut in the current loop
50 Electrical connection rod, or connector, the side with striker to release the CutOut mechanism to get drop out functionality
100 Contact disc TMF type (as one possibility), fixed side
110 Outer insulation material or surrounding insulation, shown silicone coated/embedded
120 Vacuum ceramic cylinder/insulation device
130 Contact disc TMF type, slightly moving side to get striker functionality to release dropout function, (drop out function as per today's technology)
140 Support and lid part of vacuum device
150 Flexible elements to allow limited movement, striker function (shown bellows) but can be also an elastic membrane
160 Support lid to cover the components
170 Bellows connection part or membrane to allow movement for striker functionality
180 Release spring to operate striker after current interruption
190 Connection part to support/fixation of the release spring
200 Electrical connection rod with movement to allow striking function

210 Electrical connection rod made of copper or another conductive material

220 Fuse wire/and if needed in addition steel wire

230 Electrical connection rod

In an example, when the fuse wire electrically disconnects the first electrical connection rod from the second electrical connection rod the vacuum-based fuse-CutOut is configured to move the second contact away from the first contact.

In an example, when the fuse wire electrically disconnects the first electrical connection rod from the second electrical connection rod the vacuum-based fuse-CutOut is configured to move the second electrical connection rod away from the first electrical connection rod.

In an example, the second contact is fixedly mounted to the second electrical connection rod.

In an example, the vacuum-based fuse-CutOut comprises a release spring, and when the fuse wire electrically disconnects the first electrical connection rod from the second electrical connection rod the release spring is configured to move the second contact away from the first contact.

In an example, the first contact is a transverse magnetic field, TMF, contact, and the second contact is a TMF contact.

In an example, the first contact is an axial magnetic field, AMF, contact, and the second contact is an AMF contact.

In an example, the first contact is a transverse magnetic field, TMF, contact, and the second contact is an AMF contact.

In an example, the first contact is an AMF contact, and the second contact is a TMF contact.

In an example, the first contact is a hybrid contact with the known technology of AMF/TMF or TMF/AMF combination.

In an example, the vacuum-based fuse-CutOut comprises a steel wire, and wherein when the current below the threshold levels flows through the vacuum-based fuse-CutOut or no current flows through the vacuum-based fuse-CutOut the first contact is held the fixed distance from the second contact at least in part by the steel wire.

In an example, when the current below the threshold levels flows through the vacuum-based fuse-CutOut or no current flows through the vacuum-based fuse-CutOut the first contact is held the fixed distance from the second contact at least in part by the fuse wire.

In an example, the vacuum-based fuse-CutOut comprises an outer body, and wherein the outer body is configured to maintain a vacuum within the body when the current below the threshold levels flows through the vacuum-based fuse-CutOut or no current flows through the vacuum-based fuse-CutOut.

In an example, the vacuum-based fuse-CutOut comprises an insulation part located within the outer body, and the insulation part surrounds the first contact and the second contact when the current below the threshold levels flows through the vacuum-based fuse-CutOut or no current flows through the vacuum-based fuse-CutOut.

In an example, the insulation part surrounds the first contact and the second contact during movement of the second contact away from the first contact when the fuse wire electrically disconnects the first electrical connection rod from the second electrical connection rod.

In a second aspect, there is provided a vacuum interrupter device, comprising: a vacuum-based fuse-CutOut according to the first aspect; a first electrical connector connected to the first electrical connection rod of the vacuum-based fuse-CutOut; a second electrical connector connected to the second electrical connection rod of the vacuum-based fuse-CutOut; and at least one insulation structure surrounds at least part of the first electrical connector.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vacuum-based fuse-CutOut, comprising:

a first electrical connection rod;

a second electrical connection rod;

a first contact;

a second contact;

a fuse wire;

a steel wire;

a release spring;

an insulation part surrounding the first contact, the second contact, the fuse wire, and the steel wire, the insulation part configured to maintain a vacuum around the first contact, the second contact, the fuse wire, and the steel wire;

a bellows;

a support lid; and an outer body, wherein the outer body surrounds the insulation part, the support lid, the bellows, and the release spring, wherein the support lid abuts the insulation part, and wherein the bellows are arranged between the insulation part and the release spring, wherein the first contact is mounted to the first electrical connection rod;

wherein the second contact is mounted to the second electrical connection rod;

wherein when a current below a threshold level flows through the vacuum-based fuse-CutOut or no current flows through the vacuum-based fuse-CutOut the vacuum-based fuse-CutOut is configured to hold the first contact a fixed distance from the second contact, at least in part by the steel wire and the fuse wire is configured to electrically connect the first electrical connection rod to the second electrical connection rod;

wherein when a current at or above the threshold flows through the vacuum-based fuse-CutOut the fuse wire is configured to melt, thereby electrically disconnecting the first electrical connection rod from the second electrical connection rod, wherein when the fuse wire electrically disconnects the first electrical connection rod from the second electrical connection rod the release spring is configured to move the second contact away from the first contact, and the second electrical connection rod away from the first electrical connection rod.

2. The vacuum-based fuse-CutOut according to claim 1, wherein the second contact is fixedly mounted to the second electrical connection rod.

3. The vacuum-based fuse-CutOut according to claim 1, wherein the first contact is a transverse magnetic field, TMF, contact, and wherein the second contact is a TMF contact.

4. The vacuum-based fuse-CutOut according to claim 1, wherein the first contact is an axial magnetic field, AMF, contact, and wherein the second contact is an AMF contact.

5. The vacuum-based fuse-CutOut according to claim 1, wherein the first contact is a transverse magnetic field, TMF, contact, and wherein the second contact is an AMF contact.

6. The vacuum-based fuse-CutOut according to claim 1, wherein the first contact is an AMF contact, and wherein the second contact is a TMF contact.

7. The vacuum-based fuse-CutOut according to claim 1, wherein when the current below the threshold level flows through the vacuum-based fuse-CutOut or no current flows through the vacuum-based fuse-CutOut the first contact is held the fixed distance from the second contact at least in part by the fuse wire.

8. The vacuum-based fuse-CutOut according to claim 1, wherein the vacuum-based fuse-CutOut comprises an outer body, and wherein the outer body is configured to maintain a vacuum within the body when the current below the threshold level flows through the vacuum-based fuse-CutOut or no current flows through the vacuum-based fuse-CutOut.

9. The vacuum-based fuse-CutOut according to claim 8, wherein the insulation part is located within the outer body, and wherein the insulation part surrounds the first contact and the second contact when the current below the threshold level flows through the vacuum-based fuse-CutOut or no current flows through the vacuum-based fuse-CutOut.

10. Vacuum-based fuse-CutOut according to claim 9, wherein the insulation part surrounds the first contact and the second contact during movement of the second contact away from the first contact when the fuse wire electrically disconnects the first electrical connection rod from the second electrical connection rod.

11. The vacuum-based fuse-CutOut according to claim 1, wherein the first contact and the second contact are further held opposite each other in an axial direction at least in part by the steel wire.

12. A vacuum interrupter device, comprising:

a vacuum-based fuse-CutOut, comprising:

a first electrical connection rod;

a second electrical connection rod;

a first contact;

a second contact;

a fuse wire;

a steel wire;

an insulation part surrounding the first contact, the second contact, the fuse wire, and the steel wire, the insulation part configured to maintain a vacuum around the first contact, the second contact, the fuse wire, and the steel wire, wherein the first contact is mounted to the first electrical connection rod;

wherein the second contact is mounted to the second electrical connection rod;

wherein when a current below a threshold level flows through the vacuum-based fuse-CutOut or no current flows through the vacuum-based fuse-CutOut the vacuum-based fuse-CutOut is configured to hold the first contact a fixed distance from the second contact and the fuse wire is configured to electrically connect the first electrical connection rod to the second electrical connection rod; and wherein when a current at or above the threshold flows through the vacuum-based fuse-CutOut the fuse wire is configured to melt, thereby electrically disconnecting the first electrical connection rod from the second electrical connection rod;

a first electrical connector connected to the first electrical connection rod of the vacuum-based fuse-CutOut;

a second electrical connector connected to the second electrical connection rod of the vacuum-based fuse-CutOut;

at least one insulation structure surround at least part of the first electrical connector, wherein when the current below the threshold level flows through the vacuum-based fuse-CutOut or no current flows through the vacuum-based fuse-CutOut the first contact is held the fixed distance from the second contact at least in part by the steel wire, wherein when the fuse wire electrically disconnects the first electrical connection rod from the second electrical connection rod the vacuum-based fuse-CutOut is configured to move the second contact away from the first contact, and wherein when the fuse wire electrically disconnects the first electrical connection rod from the second electrical connection rod the vacuum-based fuse-CutOut is configured to move the second electrical connection rod away from the first electrical connection rod;

a release spring;

a bellows;

a support lid; and an outer body, wherein the outer body surrounds the insulation part, the support lid, the bellows, and the release spring, wherein the support lid abuts the insulation part, and wherein the bellows are arranged between the insulation part and the release spring, wherein when the fuse wire electrically disconnects the first electrical connection rod from the second electrical connection rod the release spring is configured to move the second contact away from the first contact.

13. The vacuum interrupter device according to claim 12, wherein the second contact is fixedly mounted to the second electrical connection rod.

* * * * *